(12) United States Patent
Gogotsi et al.

(10) Patent No.: US 8,137,650 B2
(45) Date of Patent: Mar. 20, 2012

(54) NANOPOROUS CARBIDE DERIVED CARBON WITH TUNABLE PORE SIZE

(75) Inventors: Yury Gogotsi, Warminster, PA (US); Michel W. Barsoum, Moorestown, NJ (US)

(73) Assignee: Drexel University, Philadelphia, PA (US)

( * ) Notice: Subject to any disclaimer, the term of this patent is extended or adjusted under 35 U.S.C. 154(b) by 1029 days.

(21) Appl. No.: 10/561,768

(22) Filed: Mar. 23, 2006

(65) Prior Publication Data

US 2006/0165584 A1 Jul. 27, 2006

Related U.S. Application Data

(60) Provisional application No. 60/484,840, filed on Jul. 3, 2003.

(51) Int. Cl.
*C01B 31/36* (2006.01)
(52) U.S. Cl. .......................... 423/324; 423/414; 423/440
(58) Field of Classification Search .................. 423/324, 423/414, 440
See application file for complete search history.

(56) References Cited

U.S. PATENT DOCUMENTS

| | | | | |
|---|---|---|---|---|
| 3,066,099 | A | * | 11/1962 | Mohun ....................... 423/449.1 |
| 4,261,709 | A | * | 4/1981 | Itoga et al. ....................... 95/141 |
| 4,454,013 | A | | 6/1984 | Eriksson et al. .............. 204/112 |
| 5,876,787 | A | | 3/1999 | Avarbz et al. |
| 5,948,329 | A | | 9/1999 | Ohsaki et al. |
| 6,039,792 | A | | 3/2000 | Calamur et al. |
| 6,110,335 | A | | 8/2000 | Avarbz et al. |
| 6,353,528 | B1 | | 3/2002 | Hori et al. |
| 2002/0097549 | A1 | | 7/2002 | Maletin et al. |
| 2003/0034295 | A1 | | 2/2003 | Strano et al. |

FOREIGN PATENT DOCUMENTS

| | | |
|---|---|---|
| EP | 0617997 B1 | 7/2000 |
| EP | 1244165 A2 | 9/2002 |
| EP | 1049116 B1 | 12/2005 |
| GB | 971943 | 10/1964 |
| WO | WO 97/11923 A1 | 4/1997 |
| WO | WO 97/20333 A1 | 6/1997 |
| WO | WO 98/54111 A1 | 12/1998 |
| WO | WO 2004/094307 A1 | 11/2004 |
| WO | WO 2005/118471 A1 | 12/2005 |

OTHER PUBLICATIONS

Boehm et al., "Structural Parameters and Molecular Sieve Properties of Carbons Prepared from Metal Carbides", Proc. 12th Biennial Conf. On Carbon 1975 pp. 149-150.
Derycke et al., "Catalyst-Free Growth of Ordered Single-Walled Carbon Nanotube Networks", Nano Letters 2002 2(10):1043-1046.
El-Raghy et al., "Diffusion kinetics of the carburization and silicidation of $Ti_3SiC_2$", J. Appl. Phys. 1998 83(1):112-119.
Ersoy et al., "Carbon coatings produced by high temperature chlorination of silicon carbide ceramics", Mat Res Innovat 2001 5:55-62.
Gogotsi et al., "Carbon coatings on silicon carbide by reaction with chlorine-containing gases", J. Mater. Chem. 1997 7(9):1841-1848.
Gogotsi et al., "Conversion of silicon carbide to crystalline diamond-structured carbon at ambient pressure", Nature 2001 411:283-287.
Gogotsi et al., "Formation of carbon films on carbides under hydrothermal conditions", Nature 1994 367:628-630.
Gordeev et al., "Self-Organization in the Formation of a Nanoporous Carbon Material", Physics of the Solid State 2000 42(12):2314-2317.
Fedorov, N. F., "Nontraditional Solutions in the Chemical Technology of Carbon Sorbents", Mendeleev Chemistry Journal 1995 39(6): pp. 87-97.
Leis, J., et al, "Carbon nanostructures produced by chlorinating aluminum carbide," Carbon, 2001, 39, 2043-2048.

* cited by examiner

*Primary Examiner* — Stuart Hendrickson
(74) *Attorney, Agent, or Firm* — Woodcock Washburn, LLP

(57) ABSTRACT

The present invention provides a method for producing a nanoporous carbide-derived carbon composition with a tunable pore structure and a narrow pore size. Also provided are compositions prepared by the method.

13 Claims, 3 Drawing Sheets

NANOPOROUS CARBIDE DERIVED CARBON WITH TUNABLE PORE SIZE

This application is the National Stage of PCT Application number PCT/US2004/021382 filed Jul. 2, 2004, which claims the benefit of priority to U.S. Provisional Application Ser. No. 60/484,840 filed Jul. 3, 2003, each of which are herein incorporated by reference in their entirety.

This patent application claims the benefit of U.S. Provisional Patent Application Ser. No. 60/484,840, filed Jul. 3, 2003, which is herein incorporated by reference in its entirety.

GOVERNMENT INTERESTS

This invention was made with government support under Contract No. N00014-01-1-0762 awarded by the Office of Naval Research (ONR). The government has certain rights in the invention.

BACKGROUND OF THE INVENTION

Porous solids are of great technological importance due to their ability to interact with gases and liquids not only at the surface, but throughout their bulk. While large pores can be produced and well controlled in a variety of materials, nanopores in the range of 2 nm and below (micropores, according to IUPAC classification) are usually achieved only in carbons or zeolites. During the past decades major efforts in the field of porous materials have been directed toward control of the size, shape and uniformity of the pores.

Highly crystallized zeolites have a narrow pore size distribution, but discrete pore sizes and the fine-tuning of pore size is impossible in zeolites because pores are controlled by a lattice structure. Porous carbons produced by thermal decomposition of organic materials may have pore diameters down to 0.3 nm, or mesopores of several nanometers, but they typically have a broad pore size distribution that limits their ability to separate molecules of different sizes. Materials with a tunable pore structure at the atomic level and a narrow pore size distribution do not exist.

Selective etching of carbides is an attractive technique for the synthesis of various carbon structures from nanotubes to diamonds (Derycke et al. 2002 *Nano Lett.* 2:1043-1046; Gogotsi et al. 2001 *Nature* 411:283-287). Carbon produced by the extraction of metals from carbides is called carbide-derived carbon (CDC) (Gogotsi, et al. 1994 *Nature* 367: 628-630; Gogotsi, et al. 1997 *J. Mater. Chem.* 7:1841-1848). Since the rigid metal carbide lattice is used as a template and the metal is extracted layer-by-layer, atomic level control can be achieved during synthesis and the carbon structure can be templated by the carbide structure. Further structure modification and control can be achieved by varying the temperature, gas composition, and other process variables. Reaction (1):

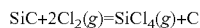

$$SiC + 2Cl_2(g) = SiCl_4(g) + C$$

has been used for the production of silicon tetrachloride since 1918, but the remaining carbon was usually burned. The linear reaction kinetics of reaction (1) allows transformations to large depth, until the particle or component is completely converted to carbon (Ersoy et al. (2001) *Mater. Res. Innovations* 5:55-62). The transformation is conformal and does not lead to changes in sample size or shape.

During the last decades, various CDCs have been investigated and specific surface areas (SSA) of up to 2000 m²/g with small pore sizes have been reported (Gogotsi et al. 1997 *J. Mater. Chem.* 7:1841-1848; Boehm et al. *Proc. 12th Biennial Conf. on Carbon* 149-150 (Pergamon, Oxford, 1975); Gordeev et al. 2000 *Phys. Solid State* 42: 2314-2317; Fedorov et al. 1995 *Russ. Chem. J.* 39:73-83). Comparison of reported data on CDCs shows that, for different carbides (SiC, TiC, ZrC, B₄C, TaC, and Mo₂C) and chlorination temperatures, pores between 0.8 and 2.1 nm, determined by the structure of the carbide precursor and process parameters, were produced. However, no control over the pore size or distribution was disclosed.

The present invention provides a method of tuning pore size in CDCs by controlling the synthesis temperature.

SUMMARY OF THE INVENTION

An object of the present invention is to provide a method of producing a nanoporous carbide-derived carbon composition with a tunable pore structure and a narrow pore size. The method of the present invention comprises extracting metals from a carbide using a halogen at elevated temperature to produce a nanoporous carbide-derived carbon composition with a tunable pore structure and a narrow pore size. Pore size is controlled by selection of the carbide and/or the halogen. Tuning of the pore size is achieved by changing the extraction temperature.

Another object of the present invention is to provide nanoporous carbide-derived carbon compositions produced with or without mesopores. Uses for these compositions include, but are not limited to, molecular sieves, gas storage, catalysts, adsorbents, battery electrodes, supercapacitors, water or air filters, and medical devices.

DETAILED DESCRIPTION OF THE INVENTION

Figure 1A:
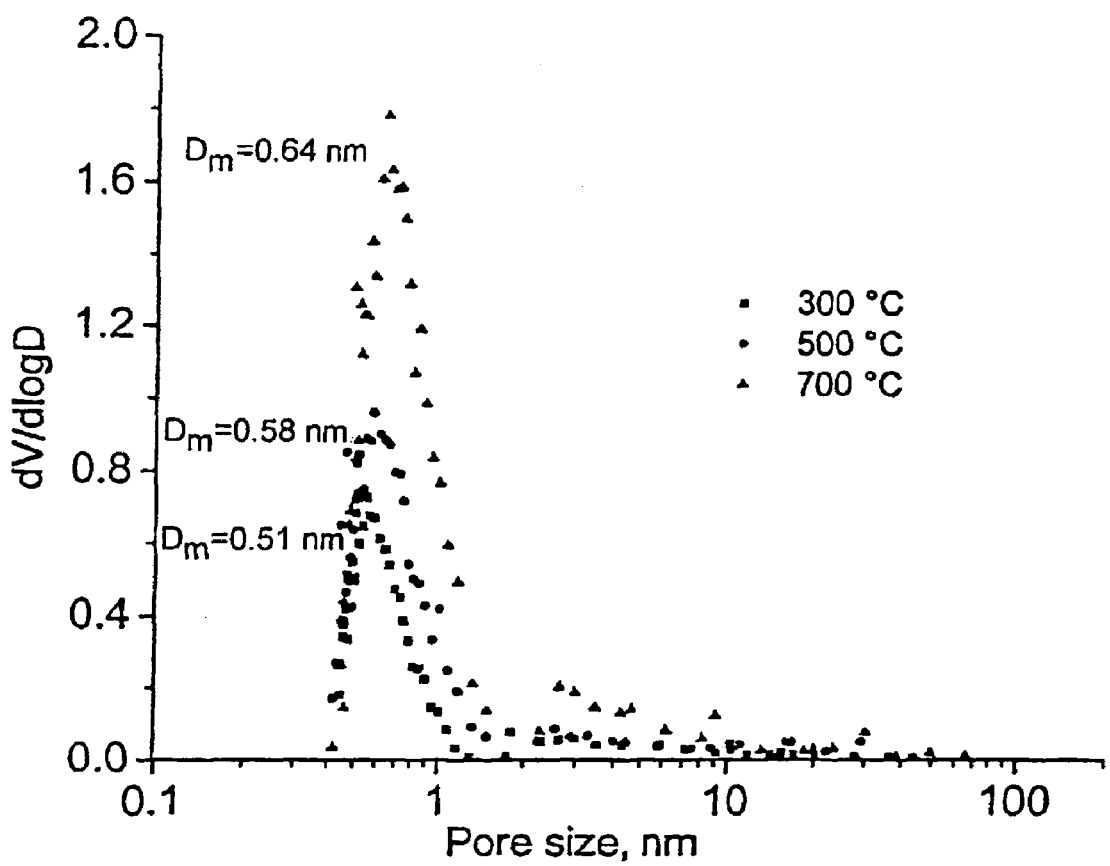
FIGS. 1a and 1b are graphs demonstrating the differential pore size distributions for CDCs produced in accordance with the method of the present invention. As shown, the pore sizes increase with increasing chlorination temperatures.

The present invention provides a method of producing a nanoporous carbide-derived carbon (CDC) composition with a tunable pore structure and a narrow pore size. In the method of the present invention, a metal carbide is exposed to a halogen so that the metal is extracted from the carbide. The inventors have found that this halogen extraction, when performed under elevated temperatures, produces a nanoporous carbide-derived carbon composition with a tunable pore structure and a narrow ranges of pore sizes. Desired pore sizes can be achieved through selection of the halogen and/or the carbide.

Halogens useful in the present invention include fluorine, chlorine, bromine, and iodine. The halogen may be in the form of a gas or liquid. By halogen gas it is meant to be inclusive of any gas or gas mixture which comprises at least one halogen. Further, the halogen gas may contain multiple halogens. In a preferred embodiment, the halogen is in the form of a chlorine containing gas or a gas mixture containing chlorine and argon (Ar).

The pore size can be selected by changing the halogen. The heavier the halogen used, the larger the resulting pores. Likewise, the smallest pores are produced by fluorine, with larger halogens like chlorine, bromine and iodine producing larger pores.

The carbide used in the present invention may be any suitable carbide. Examples of suitable carbides include, but are not limited to, SiC, TiC, ZrC, $B_4C$, TaC, and $Mo_2C$. By utilizing different carbides, the pore sizes can also be tuned to a selected or desired size. Thus, both the halogen and the carbide may be chosen to provide a desired pore size. In a preferred embodiment the carbide is $Ti_3SiC_2$. CDC produced from $Ti_3SiC_2$ has a more narrow pore size distribution than single wall carbon nano-tubes or activated carbons, and it has a pore size distribution that is comparable to that of zeolites. $Ti_3SiC_2$ is available in different forms including powders and bulk samples. $Ti_3SiC_2$ is a soft ceramic with a lamellar structure which can easily be machined to any shape. Etching of $Ti_3SiC_2$ generates a larger pore volume, about 75%, as compared to TiC or SiC which are about 56.2% and 57.3%, respectively.

The method of the present invention allows tuning the porosity of carbide-derived carbons (CDCs) with sub-Ångström accuracy in a wide range by controlling the halogen temperature. The desired pore size of the composition is achieved by selection of a halogen and of a carbide each for their respective tuning ability. Elevated temperatures for the halogen extraction are then chosen to selectively tune the carbide composition. Preferably the CDCs of the present invention are produced at elevated temperatures from between 200° C. to 1400° C. CDCs can be produced as a powder, a coating, a membrane or parts with near final shapes. The CDC may be produced with or without mesopores. When the elevated temperature is above 700° C., isotherms of CDCs are produced with the presence of mesopores.

Tunable pore size can be achieved with the method of the present invention with at least 0.05 nm accuracy.

For example, the inventors have found that chlorination in a flow of pure $Cl_2$ for 3 hours in a quartz tube furnace results in extraction of Ti and Si from $Ti_3SiC_2$ leading to the formation of carbon by the reaction:

Figure 1B:
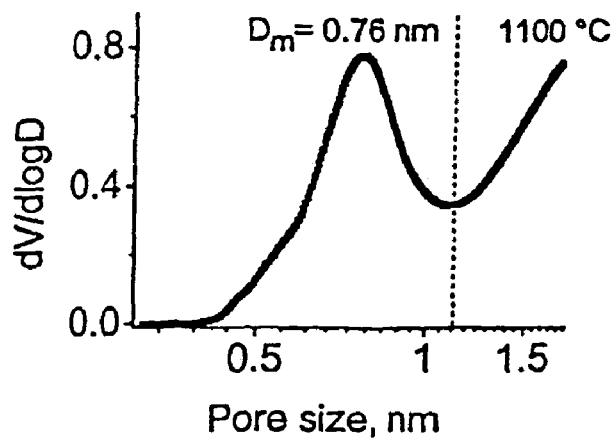

Several different techniques were independently used to measure the resulting pore size. These included argon (Ar), and methyl chloride ($CH_3Cl$) sorption, as well as small-angle X-ray scattering (SAXS). As shown in FIGS. 1a and 1b, the pore sizes of CDCs increase with increasing temperature. The differential pore size distributions for CDC as measured by methyl chloride are illustrated in FIG. 1a. The differential pore size distributions for CDC as measured by argon adsorption technique are illustrated in FIG. 1b. No mesopores or macropores were detected at 300-500° C. A small volume of mesopores of 2-4 nm in size appeared at 700° C., and the volume of mesopores increased sharply at 1100° C. and above. Pore size distributions were calculated using the Horvath-Kawazoe method and assuming a slit pore model. Ar adsorption was measured at −186° C. The sorption isotherms of low-temperature CDCs (up to 600° C.) obtained using $N_2$, Ar, or, $CH_3Cl$ were of type I in the Brunauer classification, which is evidence of the presence of nanopores and the absence of meso- or macropores. This is in agreement with the differential pore size distributions shown in FIG. 1a. Very small pore sizes were achieved at low temperatures; just slightly larger than the interplanar spacing in graphite (0.3354 nm). Remarkably, the pore size distributions are very narrow (FIG. 1a) and close to those of VPI-5 zeolite.

Isotherms of CDCs produced above 700° C. were of type IV, which indicates the presence of mesopores. Total pore volumes observed for the samples produced at 700° C., 900° C., and 1100° C. were almost the same, but the pore size distributions were different.

Mesopore volume and size was found to increase with increasing chlorination temperatures. Their equivalent radius was less than 3 nm at 700° C. (FIG. 1a) and about 6 nm at 1100° C. (FIG. 1b). Weight loss and energy-dispersive X-ray spectroscopy (EDS) analysis of the samples after chlorination suggested almost complete removal of Ti and Si above 400° C.

Since the CDCs retained the original volume of the carbide precursor, it is fair to assume the total pore volume to be the same after chlorination at different temperatures. The maximum pore volume of about 0.64 $cm^3/g$ accessible to Ar and $N_2$ in CDC after heat treatment at 700° C. to 1400° C. is in agreement with the theoretically calculated value of 0.645 $cm^3/g$. SAXS measurements confirm the evolution of pore size with increasing processing temperature.

Figure 2A:
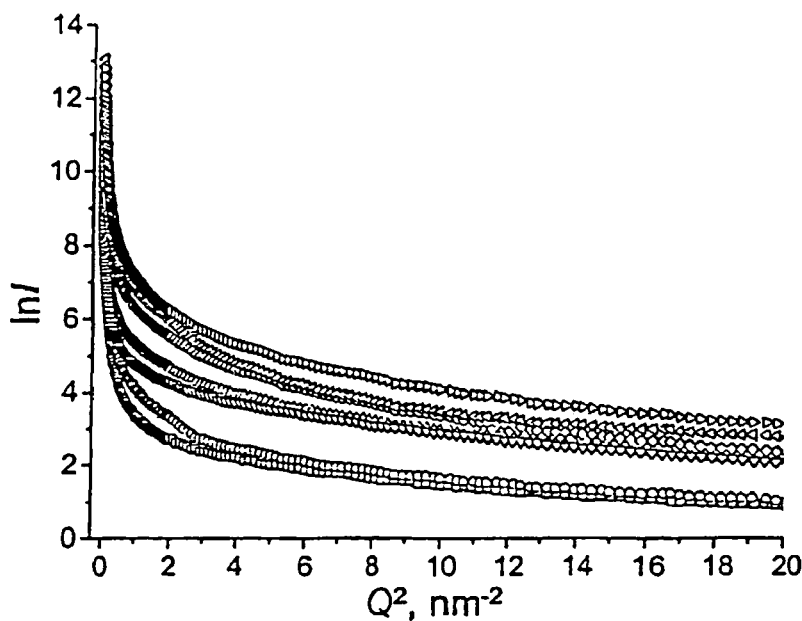
FIGS. 2a, 2b and 2c show data for seven CDC samples produced in accordance with the method of the present invention spanning elevated chlorination temperatures of between 300° C. and 1400° C., demonstrating that pore size can be controlled with better than 0.05 nm accuracy.
Figure 2B:
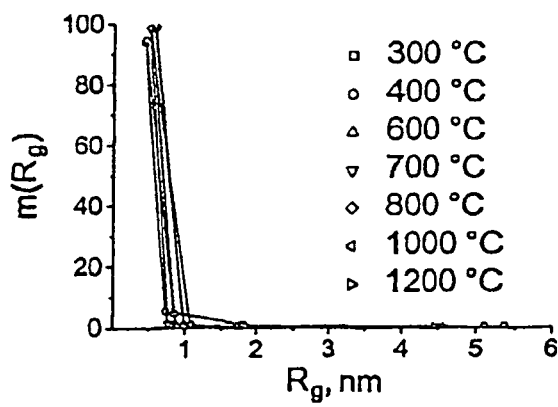
Figure 2C:
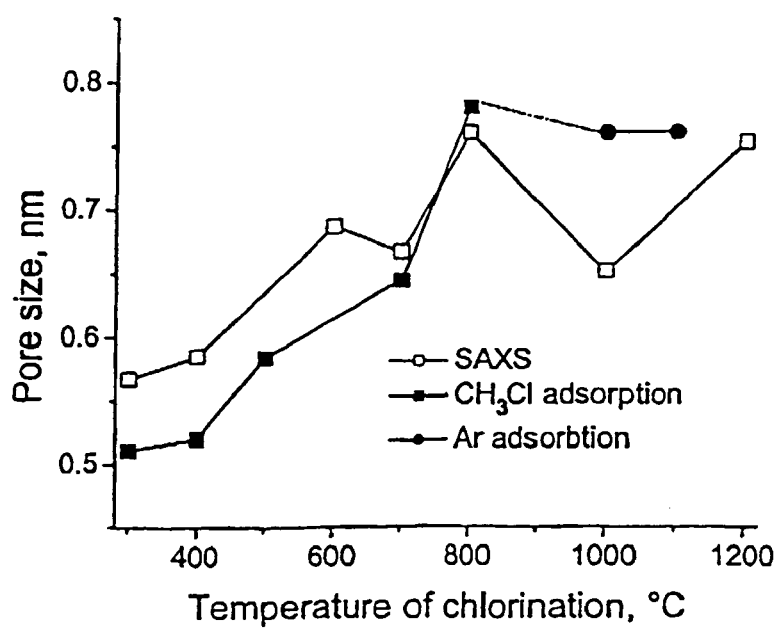

FIG. 2 shows data for 7 samples spanning the range between 300° C. and 1200° C. and demonstrating the dependencies of gyration radius ($R_g$) and pore size on chlorination temperature. FIG. 2a shows experimental SAXS curves in Guinier coordinates; FIG. 2b shows a distribution of gyration radius m($R_g$); and FIG. 2c shows a comparison of pore sizes obtained by $CH_3Cl$ sorption and SAXS for different chlorination temperatures of $Ti_3SiC_2$. No pores with $R_g$ larger than 0.6 nm were detected by SAXS. The SAXS-derived $R_g$ at 600° C. is 0.53 nm, while the sorption-based $D_m$ (average of 500° C. and 700° C. values) is 0.61 nm. Taking the latter as the height of slit pores, the implied R is 0.71 nm, comparable to the radii of slit-shaped nanopores in polymer-derived materials. Thus, slit pores have been formed in CDC. Extremely fine tuning of pore sizes is possible between 300° C. and 800° C. At higher temperatures, growth of mesopores volume occurs at the expense of nanopores. The results have been corrected for background and scattering by the quartz container. Monodisperse Guinier behavior is observed, log(I) approximately $-Q^2 (R_g)^2/3$ over a broad range of $Q^2$ (FIG. 2a), as evidenced by the fact that the analysis gives a very narrow peak in m($R_g$) which accounts for most of the nanopore volume (FIG. 2b).

The analysis of the $CH_3Cl$ sorption data assumed slit pores, which implies that the sizes in FIG. 1 are associated with the height of the slits. Slit pores are the logical choice, given the layered nature of the precursor material. For slit pores approximated as cylinders of radius R and height D, $R_g^2=D^2/12+R^2/2$. SAXS confirms the aforementioned sorption data and shows that pore size can be controlled with better than 0.05 nm accuracy (FIG. 2c). This result is remarkable in that it has never been demonstrated for any other porous material.

Microstructural studies of CDCs were conducted to explain their structural reorganization and the development of their porous structure with temperature. With increasing temperature, the specific distance for jump of carbon atoms increased and the pore size increased accordingly.

Figure 3A:
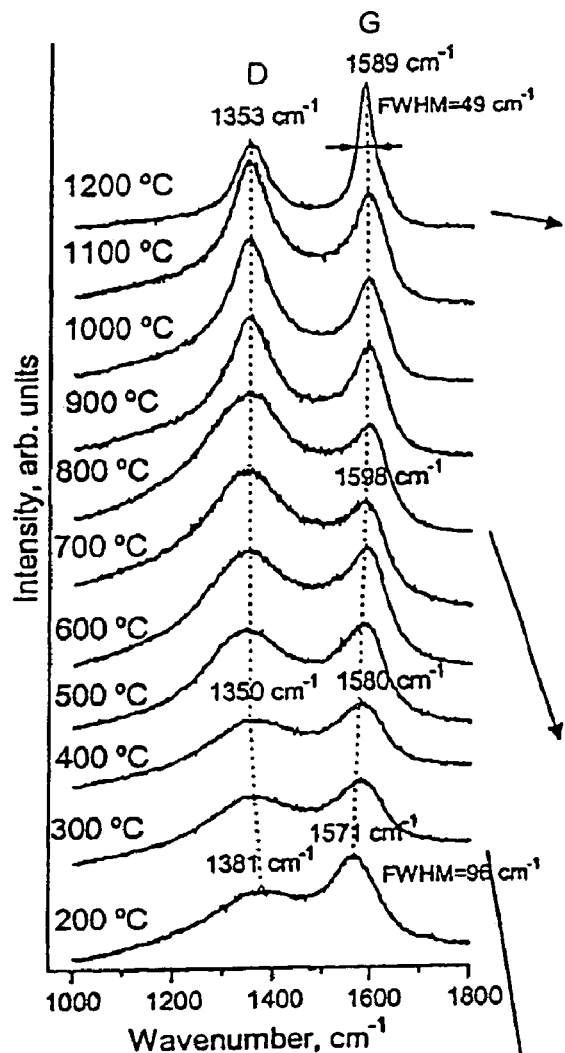
FIGS. 3a and 3b show data from Raman spectroscopy indicating that carbon is formed at 200° C. from initial carbide precursors.
Figure 3B:
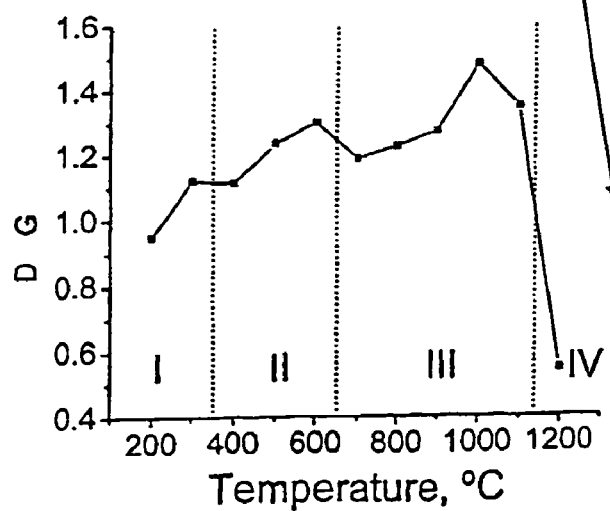

Raman spectroscopy shown in FIGS. 3a and 3b demonstrate that carbon already forms at 200° C. However, XRD shows peaks of the initial carbide; thus the transformation was not complete at this temperature. Raman spectra and TEM micrographs of CDC were produced at different temperatures. FIG. 3a illustrates the Raman spectra of CDC synthesized at different temperatures. A low position of G-band and upshifted D-band in the Raman spectrum is likely the result of carbon bonding to Si and significant $sp^3$ hybridization of carbon. Si (<15%) was detected by EDS in the samples chlorinated at 300° C., showing that Ti was preferentially etched at lower temperatures. Different rates of Si and Ti reaction were also observed in carburization and silicidation of $Ti_3SiC_2$ above 1400° C. (El-Raghy et al. 1998 *J. Appl. Phys.* 83:112-119). FIG. 3*b* demonstrates the temperature dependence of $I_D/I_G$ ratio and provides TEM images showing evolution of the carbon structure with temperature. CDC produced in temperature range I (300° C.) is completely amorphous. Slow pore growth occurs in range II. Formation of carbon fringes at 700° C. and higher temperatures show the beginning of the structure ordering leading to increasing pore size and appearance of mesopores in range III. Pronounced graphitization is observed at 1200° C. (range IV), resulting in a sharper G-band in the Raman spectrum and decreased $I_d/I_g$ ratio.

Ti can be extracted by $Cl_2$ at lower temperatures than Si. Complete removal of Si from CDC and a decreased amount of trapped chlorine leads to an increase in pore volume from 0.25 $cm^3/g$ at 300° C. to 0.645 $cm^3/g$ at 700° C. A slow increase in intensity and downshift of the D-band in the Raman spectra are observed with increasing temperature. According to high-resolution TEM analysis and selected area diffraction, the CDC samples produced at lower temperatures were completely amorphous. Noticeable ordering of graphite starts at 700° C. and nanocrystalline graphite appears at 1200° C. The FWHM of the G-band decreases slightly above 600° C., but only at 1200° C. does Raman spectroscopy show the formation of ordered graphitic carbon.

Total volume and characteristic dimensions of meso- and nanopores can be controlled by selection of a binary or ternary carbide or a carbide solid solution and variation of the chlorination process parameters. For example, carbon derived from SiC at 900° C. has a narrow pore size distribution and an average pore size of 0.65 nm, similar to CDCs produced from $Ti_3SiC_2$ at 700° C., but with no mesopores. Carbon made from SiC at 1200° C. had a pore size of 1.2 nm, and SiC and $B_4C$ derived carbons have values from 0.8 to 2.1 nm. Depending on the carbide structure, the pore volume of CDCs can vary from ~50% to ~80%. CDCs derived from $Ti_3SiC_2$ have the theoretical density of 0.55 $g/cm^3$. CDC samples are hydrophilic and adsorb water quickly; rapidly sinking in water. However, if the surface is sealed with a sealing compound, lacquer, polymer, nail polish or other suitable sealant, they float because their density is well below 1 $g/cm^3$.

It is notable that CDCs do not have macroporosity if produced from a dense ceramic or a carbide single crystal. However, a controlled amount of macroporosity can be introduced by using sintered porous ceramics. Macroporosity or mesoporosity, that appears at high chlorination temperatures, is not desirable for molecular sieve membranes, but would be necessary for catalytic and some other applications, because it allows easier access to nanopores. Based on their tunable porous structures, controlled surface chemistry, and other properties, CDCs may be used for some applications where single-wall carbon nanotubes are currently considered. For example, CDC is an attractive material for electrodes for electrochemical double-layer capacitors commonly called "supercapacitors" because the pore size distribution can be tuned to match various electrolytes.

Hydrogen uptake depends on the porous structure of the adsorbent. The highest uptake was achieved in nanoporous carbons with SSA above 1000 $m^2/g$ and almost no mesopores. CDCs produced at 600° C. and 1100° C. have SSA of 1061 $m^2/g$ and 1431 $m^2/g$, respectively, and SSA of up to 2000 $m^2/g$ has been measured for SiC- and $B_4C$-derived CDC. The ability to tune the pore size to exactly fit the hydrogen (or other gas) molecule is of principal importance for gas storage applications. About 40 wt. % $Cl_2$ is trapped in CDCs produced at 300-400° C. at room temperature and ambient pressure, if the cooling is done in argon, and it can reach 55-60 wt. % when cooled in $Cl_2$. The amount of $Cl_2$ stored decreases with increasing pore size, reaching less than 5 wt. % at 1200° C. The stored chlorine is slowly released, and its amount goes down to approximately 20 wt. % after storage for ten days in open air.

Fast release of atomic chlorine is observed upon heating in He up to 600° C. at 10° C./minute. Attempts to measure SSA of CDC produced at 300° C. by the BET method resulted in the unreasonably low values of 162 $m^2/g$ for $N_2$ and 382 $m^2/g$ for Ar. This clearly shows the selectivity of CDC to different gases. A significant volume of nanopores inaccessible to large molecules may allow for the separation of hydrogen from $N_2$ and other gases. Further, the combination of near-net shape and very mild chlorination temperatures are not only unique to $Ti_3SiC_2$, but also bode well for the inexpensive mass production of CDC components, which, unlike zeolites, can have a large size and complex shape.

The following nonlimiting examples are provided to further illustrate the present invention.

EXAMPLES

Example 1

Calculation of Total Pore Volume

Total pore volume (VΣ) and average pore size were calculated from Ar and $CH_3Cl$ adsorption isotherms according to HK (Horvath and Kawazoe) theory. Specific surface area, according to BET (Brunauer, Emmet, and Teller) theory and nanopore volume, was calculated using t-plots based on the $CH_3Cl$ or Ar sorption isotherms. Nitrogen adsorption did not produce reliable results on samples with a pore size smaller than 1 nm. Ar adsorption (Micromeretics ASAP Pore Analyzer) was used to measure pore sizes above and under 1 nm, but the technique required long periods of time (5 days) for equilibration and could not produce the full distribution when the pore size approached 0.5 nm. The methyl chloride adsorption isotherms were used to measure the pore size below 0.7 nm assuming a slit pore shape.

Example 2

Small-Angle X-Ray Scattering

Small-angle X-ray scattering (SAXS) was performed on a multi-angle diffractometer equipped with a Cu rotating anode, double-focusing optics, evacuated flight path and 2-D wire detector. Data was collected over the Q range 0.005-1.4 $Å^{-1}$. Powder samples were loaded into 1.5-mm-diameter quartz capillary tubes and measured in transmission for 1 hour. The scattering intensity from an empty capillary was then collected and subtracted with sample absorption corrected. Expecting a finite but narrow distribution of radii of gyration $R_g$, a modified Guinier analysis was employed to obtain the mean pore size and distribution. The fraction volume of pores of a given size was then estimated for each sample. By deconvoluting the experimental ln(I) vs. $Q^2$ curves into components corresponding to pores with different $R_g$, distribution functions of $R_g$ were found.

Example 3

Determination of Structure of CDCs

Raman microspectroscopy (Renishaw 1000, Ar ion laser, 514.5 nm), transmission electron microscopy (TEM, JEOL 2010F), energy-dispersive spectroscopy (EDS) and X-ray diffraction (XRD, Siemens), were used to study the structure of CDC powders. In-plane crystal size of graphite $L_a$ was calculated by the Tuinstra and Koenig equation: $1/L_a = I_D/I_g$, where $I_D$ and $I_g$ are intensities of disorder-induced D band and graphite G band, assigned to zone center phonons of $E_{2g}$ symmetry.

What is claimed is:

1. A method of producing a nanoporous carbide-derived carbon composition having a mean nanopore diameter within the range of from about 0.05 nm to about 0.2 nm of a selected value comprising:
   (a) reacting a first quantity of a carbide composition comprising a ternary composition of silicon, titanium, and carbon with a halogen at a first temperature in the range of from about 200° C. to about 1400° C., to produce nanopores in a first quantity of carbide-derived carbon;
   (b) reacting a second quantity of the carbide composition with the halogen at a second temperature in the range of from about 200° C. to about 1400° C., said second temperature differing from said first temperature by about 100° C. or more, to produce nanopores in a second quantity of carbide-derived carbon, said carbide-derived carbon characterized as having a mean nanopore diameter that differs by an amount in the range of from about 0.05 nm to about 0.2 nm from the mean nanopore diameter of the first quantity;
   such that the mean nanopore diameter of the second quantity of carbide-derived carbon is reproducibly produced-within the range of from about 0.05 nm to about 0.2 nm of the selected value.

2. The method of claim 1 wherein the carbide composition comprises $Ti_3SiC_2$.

3. The method of claim 1 wherein the difference between the first and second temperatures is about 200° C.

4. The method of claim 1 wherein the at least one of the first and second temperatures is in the range of from about 300° C. to about 1200° C.

5. The method of claim 1 wherein at least one of the first and second temperatures is in the range of from about 300° C. to about 800° C.

6. The method of claim 1 wherein the difference between the mean nanopore diameters of the first and second quantities of carbide-derived carbon is about 0.05 nm.

7. The method of claim 1, further comprising reacting at least one successive quantity of a metal or metalloid carbide composition with the halogen at a successive temperature in the range of from about 200° C. to about 1400° C., said successive temperature differing from any preceding temperature to produce a nanoporous composition characterized as having a mean pore diameter that differs by an amount in the range of 0.05 nm to about 0.2 nm than the mean pore diameter of the first quantity or the second quantity.

8. The method of claim 1 wherein the nanopore size distribution of the second quantity of carbide-derived carbon is substantially the same as the nanopore size distribution of the first quantity of carbide-derived carbon.

9. The method of claim 1 wherein the difference between the mean pore diameter of the first and second carbide-derived carbons is about 0.1 nm.

10. The method of claim 1 wherein the nanopore size distribution of at least one of the carbide-derived carbons has a full width at half maximum of less than about 0.5 nanometers.

11. The method of claim 1 wherein the halogen comprises chlorine.

12. The method of claim 1 wherein the mean nanopore size diameter of at least one of the carbide-derived carbons is less than about 2 nm.

13. The method of claim 1 wherein the mean nanopore size diameter of at least one of the carbide-derived carbons is less than about 1 nm.

\* \* \* \* \*